United States Patent [19]
Reynolds

[11] Patent Number: 6,078,336
[45] Date of Patent: Jun. 20, 2000

[54] GRAPHICS MEMORY SYSTEM THAT UTILIZES LOOK-AHEAD PAGING FOR REDUCING PAGING OVERHEAD

[75] Inventor: Gerald W. Reynolds, Fort Collins, Colo.

[73] Assignee: Hewlett-Packard Company, Palo Alto, Calif.

[21] Appl. No.: 09/076,380

[22] Filed: May 12, 1998

[51] Int. Cl.[7] .............................. G09G 5/00; G06F 13/16
[52] U.S. Cl. ........................ 345/513; 345/521; 345/508; 345/422
[58] Field of Search .................................... 345/507–509, 345/515, 516, 513, 521, 422; 711/5, 1, 104, 105, 127, 157, 100

[56] References Cited

U.S. PATENT DOCUMENTS

| | | | |
|---|---|---|---|
| 6,000,019 | 12/1999 | Dykstal et al. | 711/157 |
| 6,002,412 | 12/1999 | Schinnerer | 345/521 |

*Primary Examiner*—Kee M. Tung

[57] ABSTRACT

The present invention provides a graphics memory system comprising at least one memory controller that utilizes a first-in-first-out (FIFO) memory architecture in combination with a look-head paging technique for paging a frame buffer memory having a multi-bank architecture. The memory controller controls accessing of a frame buffer memory of the graphics memory system. The frame buffer memory comprises a multi-bank architecture, which preferably is a two-bank architecture. The FIFO architecture comprises a plurality of FIFO memory devices (FIFOs). The memory controller is capable of determining whether a particular FIFO contains no more transactions for a particular bank and, if not, of causing that bank to be re-paged for a different FIFO. In this respect, the memory controller performs what is referred to herein as "inter-FIFO" look-ahead paging. Each of the FIFOs preferably comprises intelligence to enable it to perform look-ahead paging within that particular FIFO, or "intra-FIFO" look-ahead paging. In this respect, each FIFO comprises intelligence that enables it to analyze the entries stored in it to determine whether one bank can be re-paged by the memory controller while the other bank is being accessed by the memory controller.

25 Claims, 9 Drawing Sheets

| P | b | MEM | CAND0 | CAND1 | INH0 | INH1 |
|---|---|---|---|---|---|---|
| 0 | 1 | 1 | 0 | 0 | 0 | 1 |
| 0 | 1 | 1 | 0 | 0 | 0 | 1 |
| 1 | 1 | 1 | 0 | 1 | 0 | 1 |
| 0 | 0 | 0 | 0 | 0 | 1 | 1 |
| 0 | 0 | 1 | 0 | 0 | 1 | 0 |
| 0 | 0 | 1 | 0 | 0 | 1 | 0 |
| 0 | 0 | 1 | 0 | 0 | 1 | 0 |
| 0 | 0 | 1 | 0 | 0 | 1 | 0 |

Fig. 8

| | B | P | b | MEM | CAND0 | CAND1 | INH0 | INH1 |
|---|---|---|---|---|---|---|---|---|
| 341 | 0 | 0 | 1 | 1 | 0 | 0 | 0 | 1 |
| 342 | 0 | 0 | 1 | 1 | 0 | 0 | 0 | 1 |
| 344 | 0 | 1 | 1 | 1 | 0 | 1 | 0 | 1 |
| 346 | 1 | 0 | 0 | 0 | 0 | 0 | 1 | 1 |
| 348 | 0 | 0 | 0 | 1 | 0 | 0 | 1 | 0 |
| 349 | 0 | 0 | 0 | 1 | 0 | 0 | 1 | 0 |
| 341 | 0 | 0 | 0 | 1 | 0 | 0 | 1 | 0 |
| 342 | 0 | 0 | 0 | 1 | 0 | 0 | 1 | 0 |

Fig. 11

GRAPHICS MEMORY SYSTEM THAT UTILIZES LOOK-AHEAD PAGING FOR REDUCING PAGING OVERHEAD

TECHNICAL FIELD OF THE INVENTION

The present invention relates to a graphics memory system and, more particularly, to a graphics memory system that utilizes a first-in-first-out (FIFO) architecture in combination with look-head paging for paging the frame buffer memory.

BACKGROUND OF THE INVENTION

Many high performance graphics memory systems utilize synchronous graphics random access memory (SGRAM) for the frame buffer memory. These devices typically utilize a two-bank architecture where a page of a bank, i.e., a particular row address in the bank, can be closed and then re-opened (re-paged) while a page in the other bank is being accessed. In order for the memory controller to anticipate the requests for both banks, which are typically referred to as bank0 and bank1, the requests are normally sorted and separated into separate banks. Specifically, the bank0 requests are stored in one FIFO memory element (FIFO) and the bank1 requests are stored in a different FIFO memory element (FIFO). The memory controller then receives the output of each of the FIFO memory elements (FIFOs) and performs row comparisons to determine whether either bank will need to be re-paged so that the memory controller can open a new page in one bank as a page in the other bank is being accessed. Therefore, as soon as the page in one bank is finished being accessed, the memory controller can immediately begin accessing the page in the other bank since it has already been opened, thereby allowing re-paging to be hidden and paging overhead to be reduced.

Although the paging overhead associated with the current two-bank architecture of the frame buffer memory is less than that which would occur if each bank was required to wait until the transaction for the other bank was complete before opening a new page, there are several disadvantages associated with this paging technique. First of all, the current paging technique requires the use of two FIFOs for separately grouping the bank0 and bank1 requests. Secondly, the steps of sorting the bank0 and bank1 requests disrupts the processing order of the pixels. This disruption may not be significant in all cases, but when the transactions being requested by the memory controller are read transactions, coherency and ordering difficulties arise. The coherency issues are dealt with by performing "flushing". Flushing is performed by allowing prior write transactions to occur before a read transaction is attempted in order to ensure that the contents of the frame buffer memory do not become stale. The ordering issues are dealt with by implementing hardware in the graphics memory system that reconstructs the order of the data for read requests transactions.

Accordingly, a need exists for a graphics memory system that minimizes paging overhead in a multi-bank architecture. In accordance with the present invention, a plurality of FIFOs are implemented in the memory controller and each of the FIFOs is capable of containing transactions for each bank of the multi-bank architecture. Paging overhead is reduced by performing "intra-FIFO" look-ahead paging wherein the memory controller determines whether a particular FIFO has no more transactions associated with a particular bank and, if not, re-pages that bank for the next FIFO to be switched to in a particular sequence. Furthermore, preferably each of the FIFOs comprises intelligence to allow the memory controller to perform look-ahead paging with respect to the entries contained within a particular FIFO while processing the memory requests contained within that particular FIFO. This "inter-FIFO" look-ahead paging ability further reduces paging overhead.

SUMMARY OF THE INVENTION

The present invention provides a graphics memory system comprising at least one memory controller that utilizes a first-in-first-out (FIFO) memory architecture in combination with a look-head paging technique for paging a frame buffer memory having a multi-bank architecture. The memory controller controls accessing of a frame buffer memory of the graphics memory system. The frame buffer memory comprises a multi-bank architecture, which preferably is a two-bank architecture. The FIFO architecture comprises a plurality of FIFO memory devices (FIFOs). When communicating with a particular FIFO, the memory controller utilizes indicators from that particular FIFO to determine whether any more transactions for a particular bank exist in that particular FIFO and, if not, causes that bank to be re-paged for a different FIFO. In this respect, the memory controller performs what is referred to herein as "inter-FIFO" look-ahead paging.

In addition, each of the FIFOs preferably comprises intelligence to allow the memory controller to perform look-ahead paging while processing the memory requests contained within that particular FIFO, which will be referred to herein as "intra-FIFO" look-ahead paging. In essence, each FIFO comprises intelligence that enables it to analyze the entries stored in it to determine whether one bank can be re-paged by the memory controller while the other bank is being accessed by the memory controller.

In accordance with the preferred embodiment of the present invention, the graphics memory system comprises two memory controllers which are identical in nature. Each memory controller has a respective RAM memory element associated therewith and each memory element has two banks, namely, bank0 and bank1. The two RAM memory elements collectively comprise the frame buffer memory. Each of the memory controllers preferably comprises a Write Z FIFO, a Read Z FIFO, a Write Pixel FIFO, a Read Pixel FIFO and a RAM controller. Each of the FIFOs comprises the above-mentioned intelligence for supporting intra-FIFO look-ahead paging and for indicating if there are no more transactions contained in that FIFO for either bank0 or bank1. Each RAM controller controls the switching between its respective FIFOs in accordance with a particular sequence and performs inter-FIFO look-ahead paging in accordance with the present invention.

When the RAM controller is utilizing a particular FIFO to access the frame buffer memory, the RAM controller determines when there are no more transactions in the FIFO for a particular bank. If there are no more transactions in the FIFO for a particular bank, the RAM controller causes that bank to be re-paged for the next FIFO in the sequence. In accordance with the preferred embodiment of the present invention, in the rendering mode, the RAM controller switches first to the Read Z FIFO, then to the Write Z FIFO and then to the Write Pixel FIFO. This sequence is repeated until an interrupt request occurs.

When an interrupt request is output from an auxiliary request (ARQ) FIFO, the RAM controller switches from whatever rendering FIFO it is servicing to the ARQ FIFO to service the request. This interrupt request may be to refresh the display screen, for example. Once the interrupt has been serviced, the RAM controller returns to the rendering mode and re-enters the sequence at the point it was at when the interrupt occurred. In the rendering mode, when the RAM controller switches to the Read Z FIFO, a batch of Z coordinate data is read out of addresses of the RAM memory element which correspond to addresses stored in the Read Z FIFO. A Z comparison test is then performed on the batch to determine whether the new Z coordinate data needs to be written into the frame buffer memory. If the Z comparison test passes, new Z coordinate data is written into the Write Z FIFO. The RAM controller switches to the Write Z FIFO and the new Z coordinate data is written into the frame buffer memory. The RAM controller then switches to the Write Pixel FIFO and the corresponding pixel colors that were stored in the Write Pixel FIFO are then written into the frame buffer memory.

In accordance with the preferred embodiment of the present invention, each FIFO memory device comprises a first memory element, a second memory element, a write pointer device, a first read pointer device, and a second read pointer device. The first memory element receives a first set of entries from an input port of the FIFO memory device and stores each of the entries in a storage location in the first memory element. These entries correspond to column addresses in the frame buffer memory. The second memory element receives a second set of entries from the input port of the FIFO memory device and stores each of the entries of the second set in a storage location in the second memory element. These entries correspond to row addresses in the frame buffer memory. All of the entries are stored at storage locations in the first and second memory elements that are addressed by the write pointer.

The first read pointer device determines addresses of the first memory element for reading entries out of storage locations in the first memory element which are eventually output from the FIFO memory device via a first output port of the FIFO memory device. The second read pointer device determines whether any of the entries of the second set are tagged entries. The second read pointer device calculates addresses in the second memory element based on these tagged entries and reads them out of the second memory element. These entries are eventually output from the FIFO memory device via a second output port of the FIFO memory device. Only the tagged entries of the second memory element are output from the FIFO memory device, whereas preferably all of the entries stored in the first memory element are output from the FIFO memory device. These tagged entries correspond to entries that will require re-paging of a bank. By reading out only entries that will require re-paging, intra-FIFO look-ahead paging is realized.

In order to determine which of the entries in the second memory element are tagged entries, the second read pointer device is provided with information relating to the bank each entry is associated with, the tagged information indicating whether an entry that will require re-paging, and if the entry is a valid entry. In addition, the validity of an entry and bank information is utilized to indicate to the RAM controller if there are no entries for bank0 or no entries for bank1 remaining in the FIFO. This information is utilized by the RAM controller to determine whether a particular FIFO contains no more entries for a particular bank. If the RAM controller determines that a particular FIFO has no more entries for a particular bank, the RAM controller re-pages that bank for the FIFO that will be switched to next in the sequence, thereby providing inter-FIFO look-ahead paging.

Other features and advantages of the present invention will become apparent from the following discussion, drawings and claims.

BRIEF DESCRIPTION OF THE DRAWINGS

FIG. 8 is a table containing entries which demonstrate the logic comprised in the intelligent FIFO shown in FIG. 6 for reducing paging overhead.

FIG. 11 is a table containing entries which demonstrate the logic comprised in the intelligent FIFO shown in FIG. 10.

DETAILED DESCRIPTION OF THE INVENTION

Figure 1:
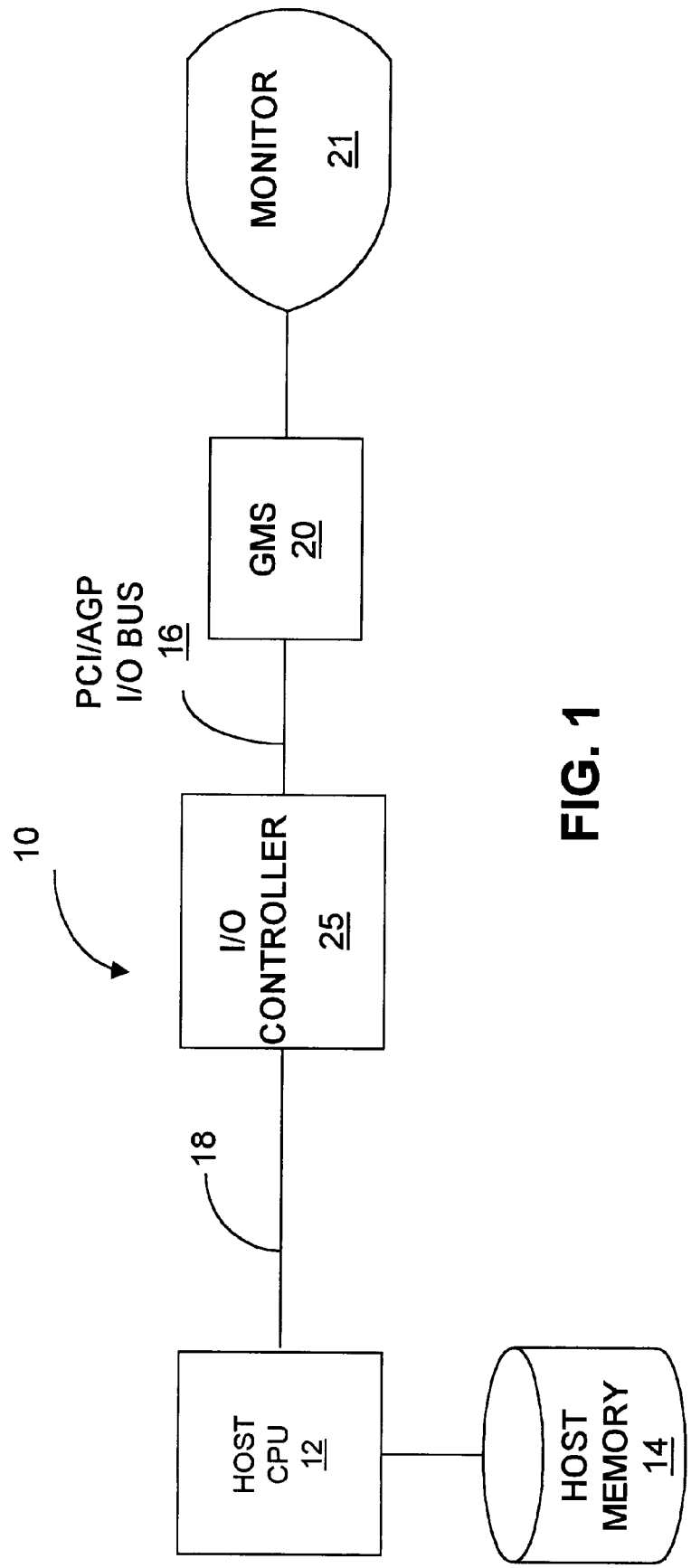
FIG. 1 is a block diagram of a computer graphics display system incorporating the graphics memory system of the present invention.

FIG. 1 is a block diagram of the computer graphics display system 10 of the present invention. The computer graphics display system 10 comprises a host CPU 12, a host memory device 14, a local bus 18, an input/output (I/O) controller device 25, an advanced graphics port/peripheral component interconnect (AGP/PCI) interface bus 16, a graphics memory system 20, and a monitor 21 for displaying graphics information output from the graphics memory system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the PCI/AGP interface bus 16. The information received over the PCI/AGP interface bus 16 is input to the graphics memory system (GMS) 20. The graphics memory system 20 then processes this information and causes graphics images to be displayed on the monitor 21.

Figure 2:
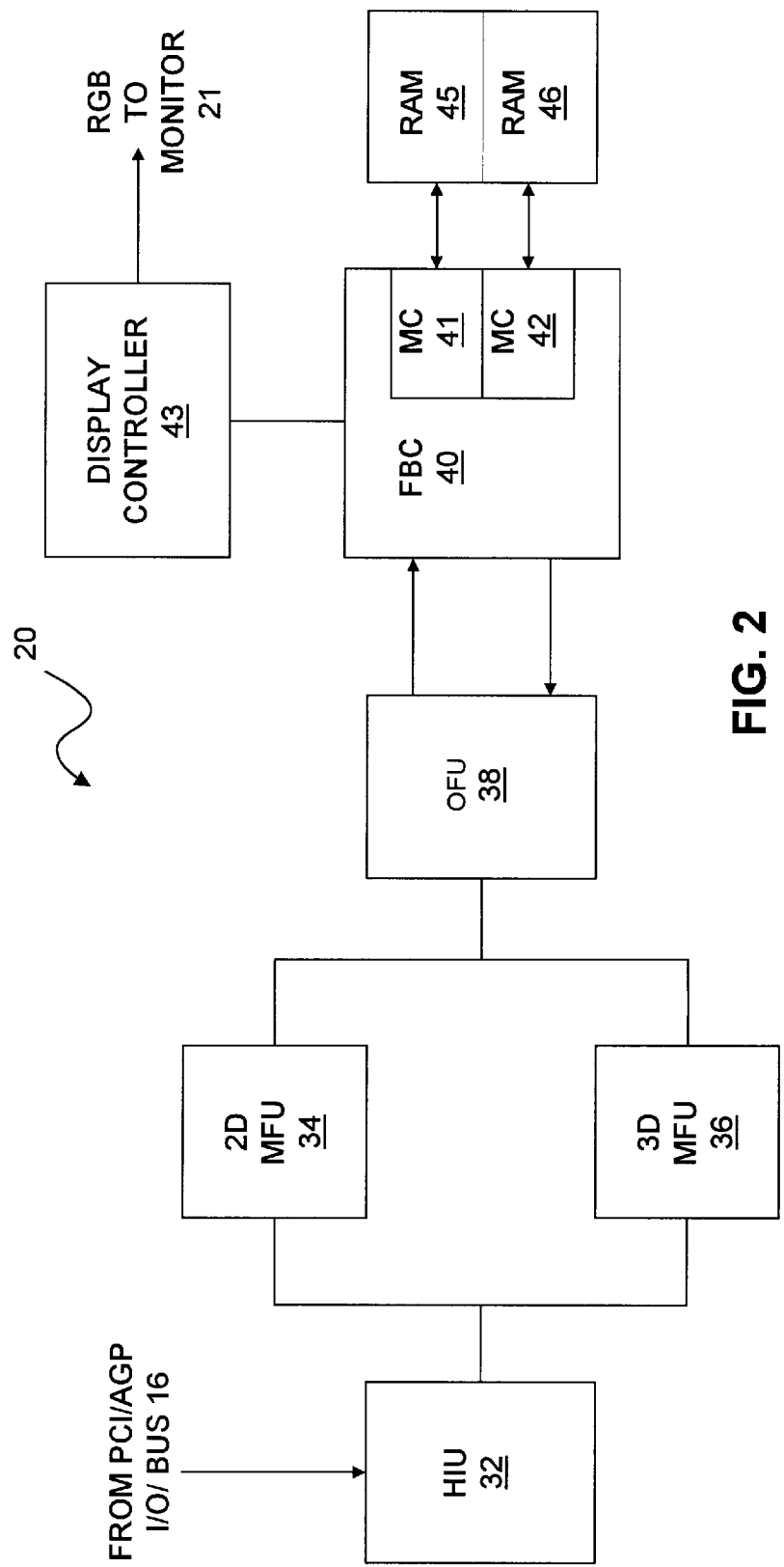
FIG. 2 is a block diagram of the graphics memory system of the computer graphics display system shown in FIG. 1.

FIG. 2 is a block diagram of the graphics memory system 20 of the present invention in accordance with the preferred embodiment. The host interface unit (HIU) 32, the 2D and 3D macro-function units (MFUs) 34, 36, the object function unit (OFU) 38, the frame buffer controller (FBC) 40 and the display controller 43 of the graphics memory systems 20 are typical components in graphics display systems. Therefore, only a cursory explanation of the functions of these components will be provided herein since persons skilled in the art will understand the types of operations that are performed by these components.

The host interface unit 32 fetches command data packets and texture maps from the host memory 14 via the PCI/AGP bus 16. The host interface unit 32 then provides graphics 2D information to the 2D macro-function unit 34 and 3D information to the 3D macro-function unit 36. The 2D macro-function unit 34 generates 2D vectors, text and rectangle spans. The 3D macro-function unit 36 performs triangle setup, 3D rastorization, and texture mapping.

The output from the 2D and 3D macro-function units 34 and 36 is received by the object function unit 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controllers (MC0 and MC1) 41 and 42 to cause memory controller 41 and memory controller 42 to write and read pixel colors and Z coordinates to and from RAM 45 and RAM 46. The frame buffer controller 40 also fetches display information which is sent to the display controller 43. The display controller 43 receives the display information and converts it into red, green and blue (RGB) analog data and sends it to the display monitor 21.

Figure 3:
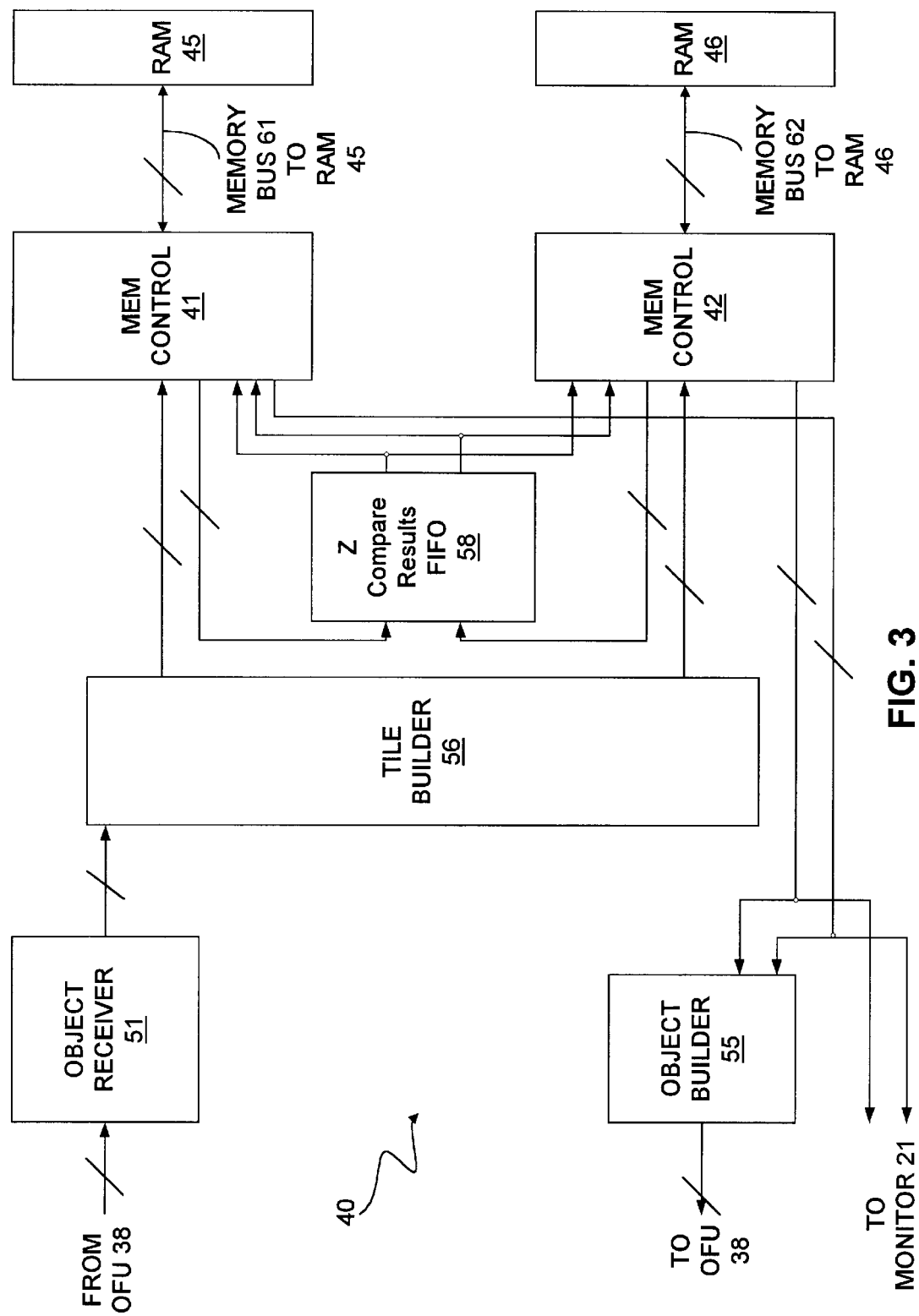
FIG. 3 is a block diagram of the frame buffer controller of the graphics memory system shown in FIG. 2 in accordance with the preferred embodiment of the present invention.

FIG. 3 is a block diagram of the frame buffer controller 40 of the present invention in accordance with the preferred embodiment. The object receiver 51 and the object builder 55 are both in communication with the object function unit 38. The object builder 55 receives pixel data from the memory controllers 41 and 42 read out of RAM 45 and RAM 46, respectively, and provides the read data to the object function unit 38. The object builder 55 receives 32-bit data from each of the memory controllers 41 and 42 and reformats the data if necessary and builds 64-bit objects for use by the object function unit 38. The object receiver 51 receives X, Y and Z screen coordinates and Y, U, V or R, G, B color data from the object function unit 38, converts the color data into R, G, B format if necessary, and provides the coordinate and R, G, B color data to the tile builder 56. The tile builder 56 builds tiles, which are 32-bit words of Z coordinate data and color data, and maps the X and Y screen coordinates into tile row and column addresses corresponding to locations in the RAM 45 and RAM 46.

The tile builder 56 outputs tiles of Z data and color data along with their corresponding row and column addresses to the memory controllers 41 and 42. The tile builder 56 also inserts a batch delimiter after the last tile of the coherent batch of pixels (i.e., no two pixels within a batch having the same X, Y address). In accordance with the preferred embodiment of the present invention, two memory controllers and two RAM memory devices are implemented in the graphics memory system 20. However, it will be understood by those skilled in the art that the present invention is not limited with respect to the number of memory controllers that are implemented in the graphics memory system 20. The use of multiple memory controllers enhances the performance of the graphics memory system 10 of the present invention, as will be understood by those skilled in the art. The batching architecture and technique of the present invention can be used with a single memory controller and a single frame buffer memory element.

Each of the memory controllers 41 and 42 receives Z row and column addresses, pixel row and column addresses, and pixel color data. Each of the RAM memory elements 45 and 46 comprises an image buffer storage area (not shown) and a Z buffer storage area (not shown). The pixel color data is stored in the image buffer storage area and the Z coordinate data is stored in the Z buffer storage area. Thus, the present invention utilizes detached Z buffering in that the Z coordinates are not interleaved with the color values, but rather are stored in a separate area of RAM.

In accordance with the preferred embodiment of the present invention, Z coordinate data is read out of RAM 45 and RAM 46 by memory controllers 41 and 42 in batches so that the bus turn around time, i.e., the number of states required for the RAM bus 61 or 62 to switch between read and write transactions, is amortized over a plurality of pixels. By amortizing the bus turn around time over a plurality of pixels, any processing latencies associated with detached Z buffering are minimized. Furthermore, re-paging is also amortized over a plurality of pixels, thereby reducing paging overhead.

The batching architecture and technique of the present invention in accordance with the preferred embodiment will now be described with respect to only memory controller 41 and RAM element 45, since the memory controllers 41 and 42 function identically. It should be noted that the memory controllers 41 and 42 are capable of processing batches of data simultaneously. Therefore, operations which are identical to the operations discussed below of the memory controller 41 in conjunction with RAM 45 may be concurrently performed by memory controller 42 in conjunction with RAM 46.

Memory controller 41 compares a batch of new Z coordinate data received from the tile builder 56 with a batch of Z coordinate data read out of RAM 45. As each Z coordinate is compared, the Z comparison results are queued in the Z Compare Results FIFO 58 for use by either of the memory controllers 41 and 42 to determine whether the new color corresponding to the Z coordinate compared must be written into the RAM of the respective memory controller or whether the new color can be discarded. The purpose of the Z Comparison Results FIFO 58 is discussed in more detail below with respect to FIG. 4.

Re-paging overhead will be reduced in most cases due to the fact that a large number of pixels will be processed within a batch. Most of the time, for small batches, re-paging occurs only when accesses are switched from pixel color writes to Z coordinate data reads, or from Z coordinate data writes to pixel color writes. For large batches, when re-paging is required within a batch of Z reads, Z writes, color reads, or color writes, the extra re-paging can be "hidden" and, therefore, generates little or no overhead.

Figure 4:
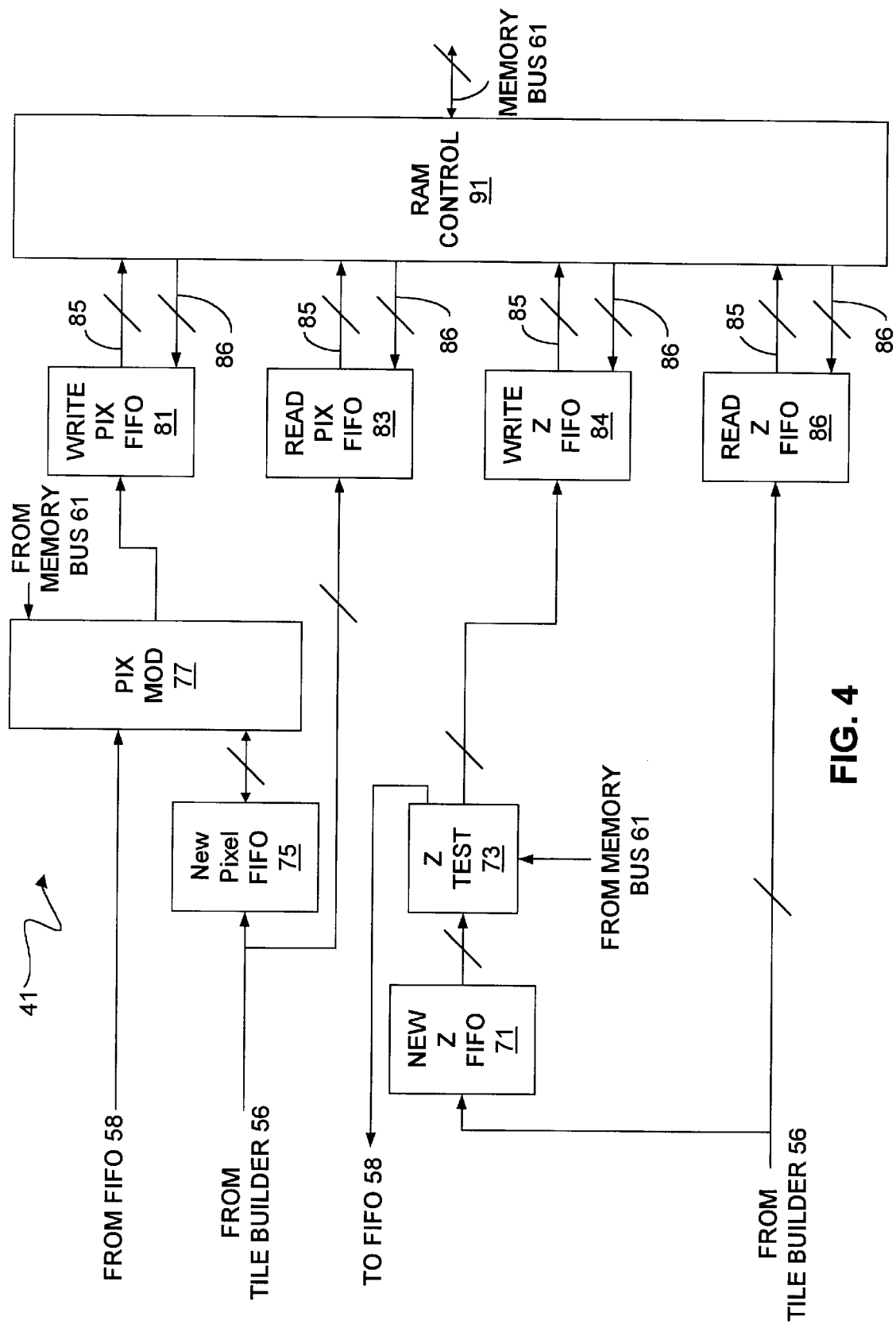
FIG. 4 is a block diagram of one of the memory controllers of the frame buffer controller shown in FIG. 3 in accordance with the preferred embodiment of the present invention.

FIG. 4 is a detailed block diagram of the memory controller 41 shown in FIG. 3. The batching technique of the present invention in accordance with the preferred embodiment will now be discussed with respect to FIG. 4. A batching sequence begins when the tile builder 56 writes a pixel color and its corresponding Z coordinate data to the memory controller 41. The Z coordinate is written to the New Z FIFO 71 and the corresponding Z coordinate row/column address is written to the Read Z FIFO 86. The new pixel color row/column address and color data are written to the New Pixel FIFO 75. These writes continue until the New Z FIFO 71 and the New Pixel FIFO 75 fill up. This allows multiple batches of data to be queued up while the current batch is being processed.

In accordance with the preferred embodiment of the present invention, a batch will consist of a group of write requests that is limited in size to ensure data coherency and to prevent the FIFOs of the memory controller 41 from being overflowed. Each request of the batch will correspond to a different address in RAM 45. The boundaries of the batches are identified by batch delimiters which notify the memory controller 41 that the end of a batch has occurred. The batch boundaries are defined in the computer graphics display system 10 in accordance with a predetermined criterion, which is selected by the system designer in accordance with practical considerations, as will be understood by those skilled in the art. Batch delimiters are generally known in the art and, therefore, a detailed discussion of their use with the present invention will not be provided herein. It will be understood by those skilled in the art that the present invention is not limited to any particular technique for identifying the boundaries of a batch.

In accordance with the preferred embodiment of the present invention, the memory controller 41 uses the batch delimiter for control during batch processing. Batch delimiters are written to the New Pixel FIFO 75, to the Read Pixel FIFO 83, and to the Read Z FIFO 86. Once the Z address has be written to the Read Z FIFO 86, the RAM controller 91 will read the contents of the Read Z FIFO 86 and cause the corresponding Z coordinate data to be read out of RAM 45 onto the memory bus 61 and written from the memory bus 61 into the Z test component 73. For all Z coordinate data transferred from RAM 45 into the Z test component 73, corresponding new Z coordinate data is transferred from the New Z FIFO 71 into the Z test component 73. The Z test component 73 compares these values and, if the comparison passes, the new Z coordinate data is written into the Write Z FIFO 84.

Once the RAM controller 91 detects the batch delimiter in the Read Z FIFO 86, a switch is made to the Write Z FIFO 84, which stores any new Z coordinate data that passed the Z comparison test for the batch. Any valid data in the Write Z FIFO 84 is then written into RAM 45 by the RAM controller 91. Since it is possible for some or all of the Z comparisons to fail, some type of mechanism is needed to inform the RAM controller 91 when to stop looking for Z write data. Preferably, a "timeout" mechanism is used by the RAM controller 91 to determine when to stop looking for new Z write data.

The results of the Z comparison test also are written by the Z test component 73 into the Z Compare Results FIFO 58 simultaneously with the writes into the Z Write FIFO 84. The results stored in the Z Compare Results FIFO 58 are provided to the pixel modifier component 77 of both the memory controllers 41 and 42. The pixel modifier component 77 uses the Z compare results provided to it to determine whether to pass the corresponding new pixel color, which is contained in the New Pixel FIFO 75, down the pipe of the pixel modifier component 77 or whether to discard it. Any pixel color and its corresponding address that is passed through the pixel modifier component 77 ultimately is loaded into the Write Pixel FIFO 81.

When the "timeout" period mentioned above has expired and the Write Z FIFO 84 becomes empty, the RAM controller 91 switches from the Write Z FIFO 84 to the Write Pixel FIFO 81 and the new pixel colors are written by the RAM controller 91 into RAM 45. By the time the RAM controller 91 switches to the Write Pixel FIFO 81, pixel color write requests will have already been queued up so that the batch of pixel addresses and colors stored in the Write Pixel FIFO 81 are ready to be written into RAM 45.

The pixel modifier component 77 can also perform read-modify-write (RMW) operations, such as blending, on the new pixel color. RMW operations require the use of the old pixel color corresponding to the same screen coordinates as the new pixel color. To accomplish these RMW functions, the pixel address that is written by the tile builder 56 into the New Pixel FIFO 75 is also written into the Read Pixel FIFO 83. When one of these types of operations is to be performed, the RAM controller 91 will switch to the Read Pixel FIFO 83 before any switch is made to the Write Pixel FIFO 81. The old pixel color corresponding to the address stored in the Read Pixel FIFO 83 is fetched for the pixel modifier component 77. The modified pixel color is then written into the Write Pixel FIFO 81. These fetches are continued for the entire batch while modified pixel colors are queued in the Write Pixel FIFO 81. When the RAM controller 91 detects a batch delimiter in the Read Pixel FIFO 83, the RAM controller 91 will stop fetching and switch to the Write Pixel FIFO 81 and the modified pixel colors stored in the Write Pixel FIFO 81 will be stored in RAM 45.

The RAM controller 91 will continue writing new or modified pixel colors until a "write-pipe-empty" indicator (not shown) indicates completion of the current batch. When this occurs, the RAM controller 91 will switch as necessary to begin processing of the next batch.

Figure 5:
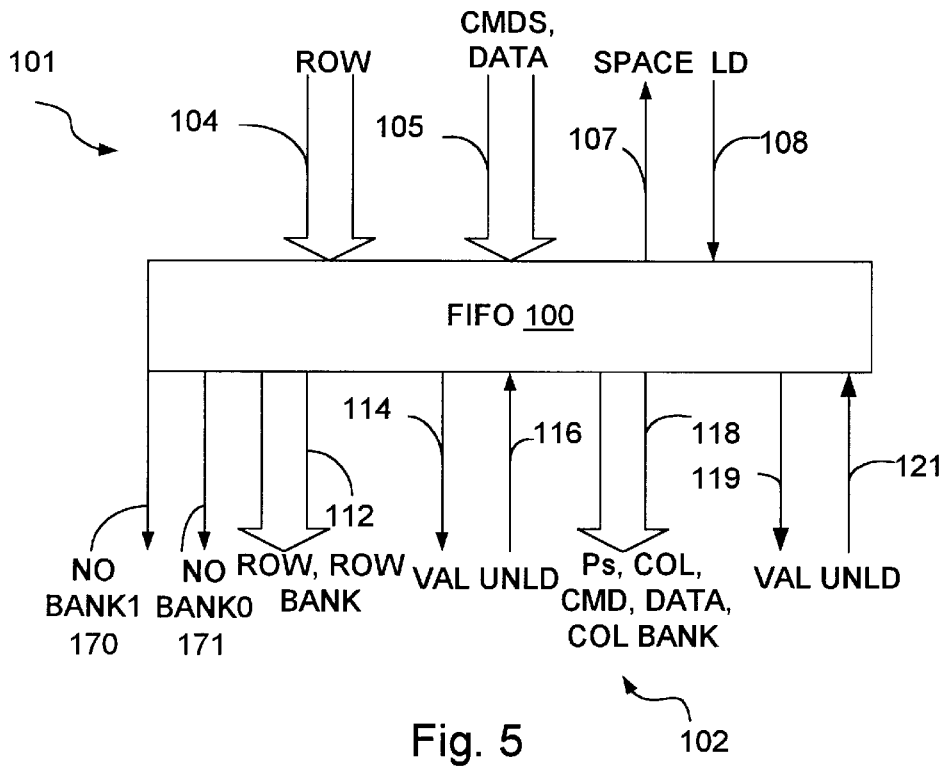
FIG. 5 is a block diagram of the FIFO of the present invention that demonstrates the ports of the FIFO and the types of information being input to or output from the ports.

In accordance with the preferred embodiment of the present invention, the Write Pixel FIFO 81, the Read Pixel FIFO 83, the Write Z FIFO 84 and the Read Z FIFO 86 preferably implement the FIFO architecture of the present invention having built-in intelligence for performing intra-FIFO look-ahead paging to reduce paging overhead. FIG. 5 is a block diagram of the FIFO 100 of the present invention that demonstrates the ports of the FIFO 100 and information being input to or output from the ports. The FIFO 100 preferably has one input port 101 and two output ports, namely, the row output port 102 and the column output port 103. The output ports 102 and 103 function independently of one another, as described in detail below with respect to FIGS. 6–8.

The input port 101 of the FIFO 100 is connected to whatever device is feeding the FIFO 100. As shown in FIG. 4, the various FIFOs 81, 83, 84 and 86 are fed by, respectively, the pixel modifier component 77, the tile builder 56, the Z Test component 73, and the tile builder 56. The input port 101 receives a paging bit ("P-bit"), a bank bit ("bank") and row and column addresses via a bus 104. In some circumstances, depending on the implementation of the FIFO 100, commands and data will also be received at the input port 101 of the FIFO 100 via a bus 105. Control lines 107 and 108 are connected to the input port 101 of the FIFO 100 and to the device feeding the FIFO 100. Line 107 outputs a "space" indication to the device feeding the FIFO 100 indicating that the FIFO 100 has space available in it for holding more information. When the device feeding the FIFO 100 receives the "space" indication from the FIFO 100, the device feeding the FIFO 100 sends a load signal on line 108 to the FIFO 100 that causes the FIFO 100 to load the information at its input port 101.

The output port 102 of the FIFO 100 unloads the row address "ROW" and the corresponding bank of the row "b" onto bus 112 at the appropriate time, which will be discussed in detail below with respect to FIGS. 6–8. The row address and row bank are unloaded when the FIFO 100 receives the unload signal "UNLD" on line 116 from the RAM controller of memory controller utilizing the FIFO 100. The page synchronization bit "PS", the column address "COL", any commands "CMD" and data "DATA", and the corresponding column bank "COL BANK" are unloaded from the FIFO 100 onto bus 118 when the unload signal "UNLD" on line 121 is received by the FIFO 100. As stated above, in accordance with the preferred embodiment of the present invention, the FIFO 100 is implemented within the memory controllers 41 and 42 shown in FIG. 3. Therefore, in accordance with the preferred embodiment, the output ports 101 and 103 of the FIFO 100 are connected to the RAM controller within the memory controller in which the FIFO 100 is being implemented. Since the memory controllers and their respective RAM controllers preferably are identical, the FIFO 100 will only be discussed herein with respect to one RAM controller and one RAM device, namely, RAM controller 91 and RAM controller 45, as shown in FIGS. 3 and 4.

The RAM controller 91 comprises logic for determining when the information at the output port 102 should be unloaded onto bus 112 and when the information at the output port 103 of the FIFO 100 should be unloaded onto bus 118, respectively. The unloading of the information onto bus 112 is independent of the unloading of the information onto bus 118. The RAM controller 91 outputs the unload signals on lines 116 and 121 to the output ports 102 and 103 of the FIFO 100 to cause the information to be unloaded from the FIFO 100 onto buses 112 and 118. Preferably, a state machine is implemented in the RAM controller 91 for determining when the column and row addresses should be unloaded from the FIFO 100. Preferably, a first state machine for performing this task is implemented in the RAM controller 91 for transactions directed to bank0 of RAM 45, and a second state machine, which is identical to the first state machine, is implemented for transactions directed to bank1 of RAM 45. The functionality of the state machine will be discussed in more detail below with respect to FIG. 8. The purpose of the page synchronization bit (PS), ROW BANK and COL BANK will be discussed in detail below with respect to FIGS. 6–11.

Figure 6:
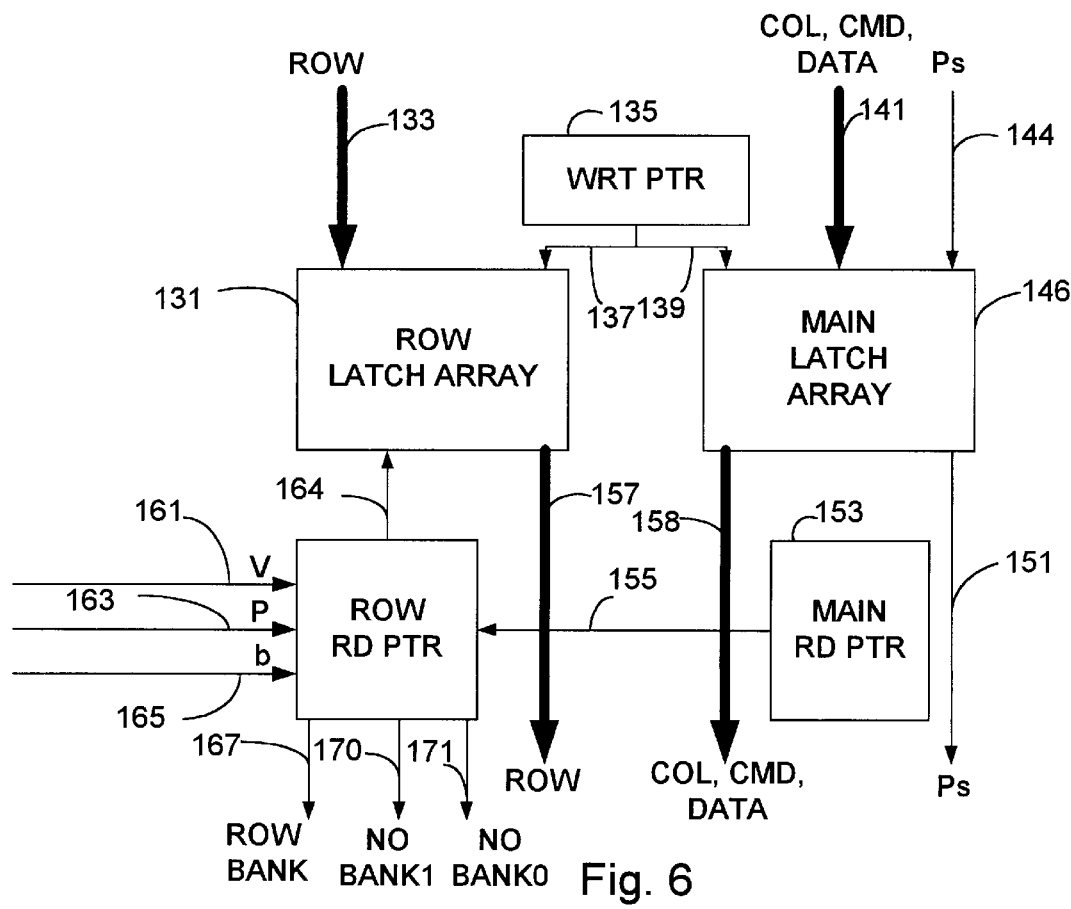
FIG. 6 is a block diagram of the FIFO shown in FIG. 5 that demonstrates the built-in intelligence of the FIFO for reducing paging overhead.
Figure 7:
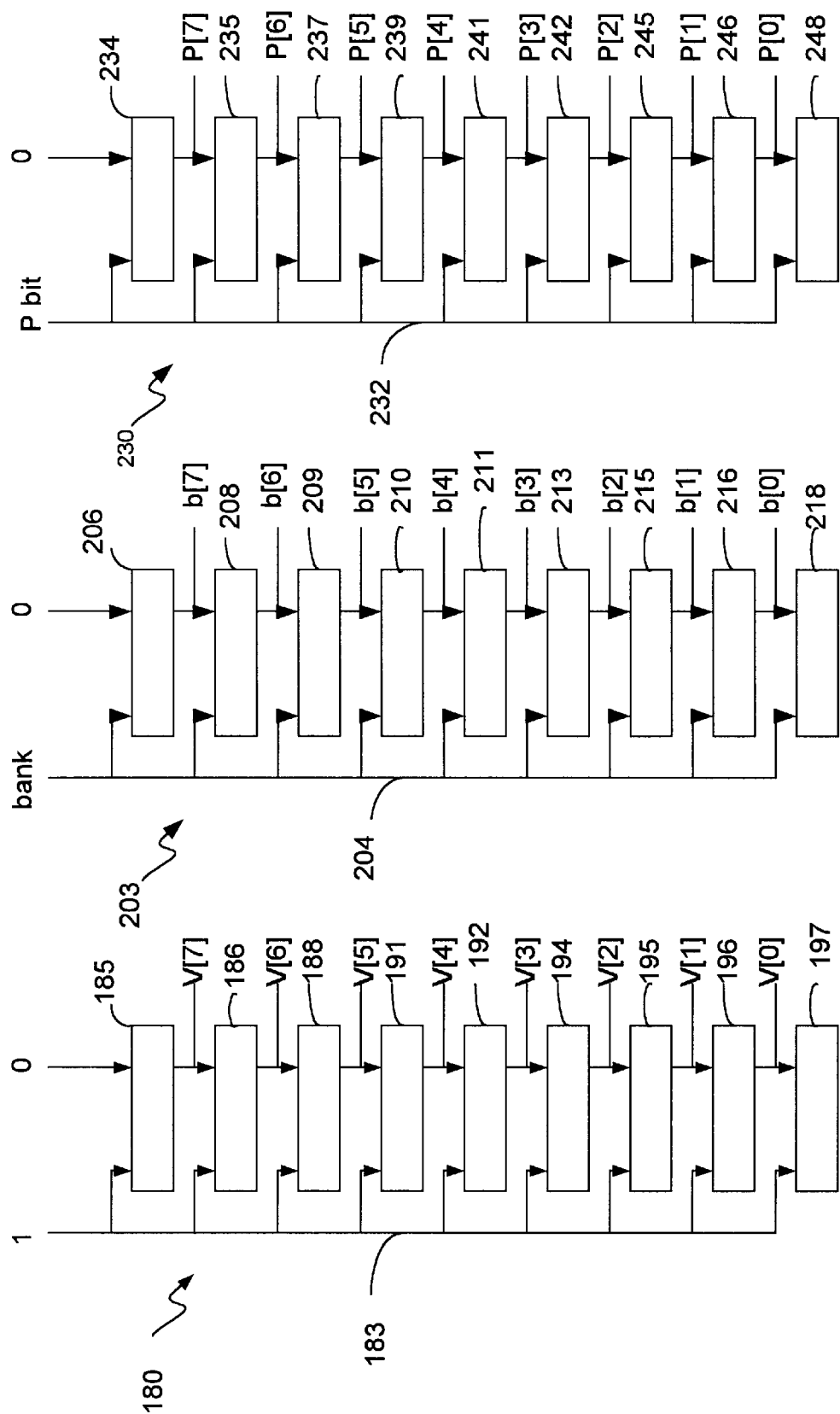
FIG. 7A–C are block diagrams of shift registers utilized by the FIFO of the present invention.

FIG. 6 is a block diagram of the internal functional components of the FIFO 100 that demonstrates the built-in intelligence of the FIFO 100 for reducing paging overhead. The buses shown in FIG. 5 have been, in some cases, replaced with individual lines in order to illustrate the manner in which the information received in the FIFO 100 is utilized by the various components of the FIFO 100. The FIFO 100 comprises a row latch array 131 for storing row addresses and a main latch array 146 for storing P bits and column addresses, and for storing any commands and data that exist. The FIFO 100 also comprises a write pointer component 135, a row read pointer component 134 and a main read pointer component 153. The write pointer component 135 is utilized by both the row latch array 131 and the main latch array 146. The write pointer component 135 points to locations in the latch arrays 131 and 146 where information is to be stored. The main read pointer component 153 points to a location in the main latch array where information is stored which is to be read from the main latch array 146. The row lead pointer component 134 points to a location in the row latch array 131 where information is stored which is to be read from the row latch array 131.

The row read pointer component 134 utilizes information from three separate shift registers for determining which row address is to be transferred, as well as for determining when the row address is to be transferred, from its memory location in the row latch array 131 into a row port output register 136. These registers are shown in FIGS. 7A, 7B and 7C. The P shift register 180 shown in FIG. 7A contains the paging bits "P" for each associated row and column entry. Each paging bit contained in the register 180 indicates whether the associated address will require its specified bank in the RAM 45 to be re-paged. When the P register 180 is loaded from the bottom up, the paging bit from the input port 101 is stored via line 183 in the location in the register 180 immediately above the locations in register 180 that contain valid entries (described below) when the input is loaded into the FIFO 100. These entries are shifted down one position each time a column address is unloaded from the column port output register 138. In accordance with the preferred embodiment, a paging bit having a value of 1 indicates that re-paging will be required for the transaction whereas a value of 0 indicates that re-paging will not be required for the transaction.

In accordance with the preferred embodiment, the FIFO 100 has a depth of 16 or 32 storage locations, which requires that the shift registers also have a depth of 16 or 32 storage locations, respectively. However, it will be understood by those skilled in the art that the present invention is not limited to any particular size for the FIFO 100 or the shift registers. For purposes of simplicity, the registers in FIGS. 7A, 7B and 7C are shown as having a depth of 8 storage locations, which means that FIFO 100 will also have a depth of 8 storage locations in this exemplary illustration.

The b shift register 203 shown in FIG. 7B contains the bank bits "b" for each of the associated row and column entries. Each of the bank bits indicates whether the address is for bank0 or bank1 in the RAM 45. In accordance with the preferred embodiment, a bank bit having a value of 0 indicates that the transaction relating to the associated address is directed to bank0 whereas a bank bit having a value of 1 indicates that the transaction relating to the associated address is directed to bank1. When the b shift register 203 is loaded from the bottom up, the bank bit from the input port is stored via line 204 in the location in the register 203 immediately above the locations containing valid entries (described below) in the shift register 203 when the input is loaded into the FIFO 100. These entries are shifted down one position each time a column address is unloaded from the column port output register 138.

The V shift register 230 shown in FIG. 7C contains valid bits "V". Each of the valid bits is associated with one entry in the P shift register 180 and with one entry in the b shift register 203 and indicates whether the associated entries in the P and b shift registers 180 and 203 are valid. In accordance with the preferred embodiment, a V bit value of 0 in a storage location in the V shift register 230 indicates that the corresponding entries in the other shift registers 180 and 203 are not valid. A V bit value of 1 in a storage location in the V-bit shift register 230 indicates that the corresponding entries in the other shift registers 180 and 203 are valid. When the input port 101 is loaded, a value of 1 is stored via line 232 in the location in the register 230 immediately above the locations containing the other V bits having values of 1. These entries are shifted down one position each time a column address is unloaded from the column port output register 138.

The P bit that is loaded into the P shift register 180 is also stored in the main latch array 146 along with the column address. Each column address stored in the main latch array is associated with one entry in the P shift register 180. When a column address is unloaded from the column port output register 138, the corresponding P bit (PS) is also unloaded from the main latch array 146, which is used for paging synchronization. The manner in which the P bits, the b bits and the V bits are utilized by the FIFO 100 will now be discussed with respect to FIG. 6–8.

FIG. 8 is a table containing entries that demonstrate the logic comprised in the intelligent FIFO 100 for reducing paging overhead. Column 262 in the table contains eight valid paging bit (P) entries. The V bits that validate these entries are not shown for ease of illustration. Each entry in column 262 of the table corresponds to a storage location in the shift register 180. For example, the P bit entry located in column 262 and row 271 of the table corresponds to the P bit stored at location 185 in the P shift register 180. Similarly, the P bit entry located in column 262 and row 282 corresponds to the P bit stored at location 196 in the P shift register 180. Therefore, the entries closer to the bottom of the table were loaded earlier in time than the entries above them in the table.

The bank (b) bit entries in the table also correspond to locations in the b-bit shift register 203. The b bit entries in column 263 of the table in the bottom four rows of the table having values of 0 correspond to transactions for bank0. The next two entries in the table in rows 274 and 276 having values of 1 correspond to transactions for bank1. The top two entries in the table in rows 271 and 272 having values of 0 correspond to transactions directed to bank0. The P bit entries having a value of 1 in column 262, rows 282, 276 and 272 of the table indicate that the RAM 45 will have to be re-paged in order to perform the transaction corresponding to the associated row addresses contained in the row latch array 131.

The CAND0 column 265 in the table corresponds to transactions that are re-paging candidates for bank0. In accordance with the preferred embodiment, a 0 in this column indicates that corresponding row address is not a re-paging candidate for a bank0 transaction and a 1 in this column indicates that the corresponding row address is a re-paging candidate for a bank0 transaction.

The CAND1 column 266 in the table corresponds to transactions that are re-paging candidates for bank1. In accordance with the preferred embodiment, a 0 in this column indicates that the corresponding row address is not a re-paging candidate for a bank1 transaction. A 1 in this column indicates that the corresponding row address is a re-paging candidate for a bank1 transaction. Alternatively, A 0 in this column could be used to indicate that the corresponding row address is not a re-paging candidate for a bank1 transaction and a 1 in this column could be used to indicate that the corresponding row address is a re-paging candidate for a bank1 transaction.

Assuming all of the entries in the P and b columns 262 and 263, respectively, are for valid transactions, as indicated by all of the entries contained in the valid shift register 230 shown in FIG. 7C being set to 1, the candidate entries in the table are those associated with the P bit having a value of 1 in column 262 of the table, rows 282, 276 and 272. Therefore, a candidate transaction is a transaction for which the corresponding paging bit and valid bit have been set to 1. The re-paging candidates are priority encoded so that only a re-paging candidate for bank0 that has no other transactions for bank0 below it in the table will continue to be considered in the row selection process. Likewise, only a re-paging candidate for bank1 that has no other transactions for bank1 below it in the table will continue to be considered in the row selection process.

The P bit having a value of 1 in column 262, row 282 indicates that the transaction associated with that entry will require re-paging and the b-bit value of 0 in column 263, row 282 indicates that bank0 will have to be re-paged in order for the transaction to be performed. These values result in a CAND0 value of 1 in column 265, row 282 of the table, indicating that the corresponding transaction is a bank0 re-paging candidate. The bank bit having a value of 1 in column 263, row 276 indicates that the corresponding transaction is for bank1. The P bit in column 262, row 276 having a value of 1 indicates that the corresponding transaction will require re-paging of bank1. These P and b-bit values result in a CAND1 value 1 in column 266, row 276 of the table, indicating that the corresponding transaction is a candidate transaction for re-paging bank1.

The bank bit having a value of 0 in column 263, row 272 indicates that the transaction is for bank0. The associated P bit in column 262, row 272 is set to 1 indicating that the corresponding transaction will require bank0 to be re-paged. The CAND0 value of 1 in column 265, row 272 indicates that the transaction is a candidate for re-paging bank0.

As stated above, once the candidates for bank0 and bank1 have been determined, the candidates are priority encoded so that only a candidate for a particular bank that has no other transactions for that bank below it in the table becomes the "dump" candidate for that bank. As shown in FIG. 8, the CAND1 entry in column 266, row 276 has a value of 1 and no other transactions for bank1 are below it in the table. Therefore, this entry is a dump candidate for bank1. However, since there are bank0 transactions below the CAND0 entry in row 272, this candidate cannot participate in the row selection process until all bank0 transactions below it in the table, namely, those corresponding to the entries in rows 282, 281, 279 and 278 of the table, have been processed. The transaction associated with the entries in row 282 of the table is a dump candidate for bank0 and, since there are no bank0 transactions below it in the table, it will continue to participate in the row selection process.

At this point in this example, there are two dump candidates remaining that can participate in the row selection process, one for bank0, namely, row 282, and one for bank1, namely, row 276. These dump candidates are priority encoded so that the one below the other in the table is finally selected. In accordance with the preferred embodiment of the present invention, the dump candidate selected, which is CAND0 in row 282 in this example, causes an offset to be generated. The magnitude of the offset depends on the position of the selected candidate in the shift registers 180, 203 and 230. Each possible position of a selected candidate will encode a particular offset value that corresponds to its position. For example, row 276 is in position 4 and will encode an offset of 4. The offset is added to the main read pointer value delivered via line 155 to the row read pointer component 134 to generate the row read pointer when the corresponding dump candidate is selected. The row read pointer component 134 addresses the row latch array 131 using this row read pointer to cause the selected row address to be dumped and transferred to the row port output register 136. It will be understood by those skilled in the art that this row read pointer can be produced in a variety of ways and that the present invention is not limited to any particular manner for generating the row read pointer.

Once the final candidate has been selected and the row address has been dumped, the corresponding P bit in the P shift register 180 is cleared so that it does not participate in the selection process a second time. Once bank0 has been re-paged for the transaction in row 282 and the row address associated with the entry in row 282 has been unloaded from the row port output register 136, the row address associated with row 276 in the table, which is for bank1, can now be selected and put into the row port output register 136. This allows bank1 to be re-paged while the transactions for bank0 corresponding to the entries in rows 281, 279 and 278 are being processed, thereby allowing the re-paging of bank1 to be "hidden."

Once all bank0 transactions below the transaction corresponding to CAND0 in row 272 are unloaded, the transaction corresponding to CAND0 row 272 can then participate in the final row selection process. Once the P bit corresponding to CAND1 in row 276 is cleared, CAND0 in row 272 can finally be selected. This allows bank0 to be re-paged while the bank1 transactions corresponding to rows 276 and 274 in the table are being processed, thereby allowing re-paging of bank0 to be "hidden."

In accordance with the preferred embodiment of the present invention, the intelligence of the FIFO 100 operates in conjunction with logic comprised in the RAM controller 91 to hide re-paging of the banks of RAM 45. Preferably, the logic comprised by the RAM controller 91 for this purpose is implemented in the form of two state machines (not shown), one for bank0 transactions and one for bank1 transactions. These two state machines function identically and, therefore, the operations of only one of the state machines will be described in detail. Also, since the state machines operate identically for bank0 and bank1, the operations of the state machine will be describe only with respect to bank0 transactions.

The state machine has three states, namely, state 0, state 1 and state 2. State 0 corresponds to the state in which no page has been opened for the bank. This state usually occurs at startup. Once a page has been opened, the state machine enters state 1. In state 1, a page has been opened, but the column address corresponding to that page has not yet been unloaded from the column port output register 138. When the corresponding column address has been output from the column port output register 138 onto bus 158, the RAM controller 91 processes the column address and the state machine enters state 2. In state 2, no column address for bank0 having a paging synchronization bit (PS) associated with it can be unloaded from the column port output register. The RAM controller 91 does, however, cause the column addresses which do not have a paging synchronization bit (PS) associated with them to be unloaded from the column port output register 138. These column addresses are then processed by the RAM controller 91. When a new row address for that bank is unloaded from the row port output register 136 onto bus 157, the state machine re-enters state 1 and waits for the corresponding column address to be unloaded from the column port output register 138.

A command dispatcher (not shown) comprised in the RAM controller 91 manages the unloading of the row port output register 136 and of the column port output register 138 by monitoring the row and column valid indicators on lines 114 and 119, the ROW BANK, the COL BANK, and the paging synchronization bit (PS), and by monitoring the state machine for each bank to determine when the information either in the row port and column port output registers is to be unloaded. Once a page has been opened, i.e., once the row address has been output from the row port output register 136 onto the bus 157, the state machine enters state 1. If the column port output register contains a valid column address having a paging synchronization bit (PS) associated with it, the command dispatcher will only unload the column port output register 138 onto bus 158 when the state machine is in state 1. The command dispatcher will only unload a column address that does not have a paging synchronization bit (PS) associated with it when the state machine for that bank is in state 2.

Once bank0 has been opened for the transaction associated with the first dump candidate in row 282, the second dump candidate, which is in row 276, is sent to the row port output register 136. Once bank1 has been opened for the transaction associated with the second dump candidate and all of the bank0 transactions below the third dump candidate have been unloaded, the third dump candidate, which is in row 272, is sent to the row port output register 136. Therefore, in the example demonstrated by FIG. 8, only three row addresses are unloaded from the row port, namely, one address for each re-paging requirement, whereas eight column addresses are unloaded namely, one for each corresponding transaction.

In accordance with an alternative embodiment of the present invention, the intelligent FIFO 100 of the present invention can have multiple batches queued in it so that when processing of the first batch is complete, processing of the second batch can begin. Preferably, the Read Z FIFO 86 and the New Z FIFO 71 are designed in accordance with this embodiment as intelligent FIFOs 100 to handle multiple batches. In accordance with the preferred embodiment, the FIFO 100 utilizes the BATCH (B) shift register 300 shown in FIG. 9 to enable the FIFO to distinguish between the current batch and the next batch to be processed. For purposes of illustration, the shift register 300 is shown as having eight storage locations for an eight word deep FIFO. However, preferably the FIFO 100 is sixteen or thirty-two words deep, requiring the B shift register 300 to have sixteen or thirty-two bits of storage locations. However, it will be understood by those skilled in the art that the present invention is not limited to any particular depth.

Each location in the shift register 300 functions as a batch ID to indicate whether a particular entry is associated with a particular batch. The batch ID is inverted for each new batch. For example, if the batch ID is 0 for the current batch, the batch ID will be one for the next batch to be processed. When the processing of the current batch is finished, the next batch becomes the current batch and the current batch will have a batch ID of 1. Therefore, the batch ID is toggled for each new batch and serves as a delimiter between batches for the selection process.

Figure 10:
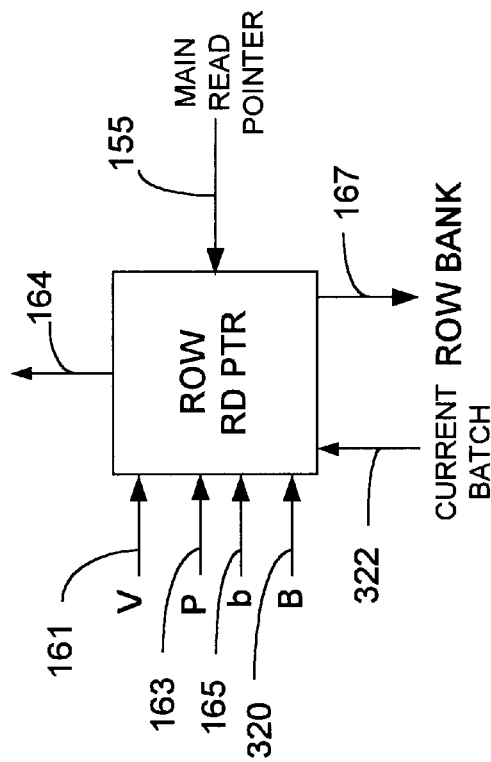
FIG. 10 is a block diagram of the intelligent FIFO of the present invention in accordance with an alternative embodiment which utilizes the shift register of FIG. 9.

As shown in FIG. 10, the row read pointer 321 in accordance with this embodiment is very similar to the row read pointer 134 shown in FIG. 6. The row read pointer 321 also utilizes the information from the shift registers 180, 203 and 230 for determining which row address is to be transferred, as well as for determining when the row address is to be transferred, from its memory location in the row latch array 131 into a row port output register 136. The output of the row read pointer 321 is also the same as the output of the row read pointer 134. As with the row read pointer 134, the row read pointer 321 also calculates an offset that is added to the main read pointer 158. The manner in which this is accomplished is substantially identical to the manner in which the row read pointer 134 performs this task. However, the row read pointer 321 performs the selection process for selecting a dump candidate in such a way that only entries associated with the current batch participate in the selection process.

Figure 9:
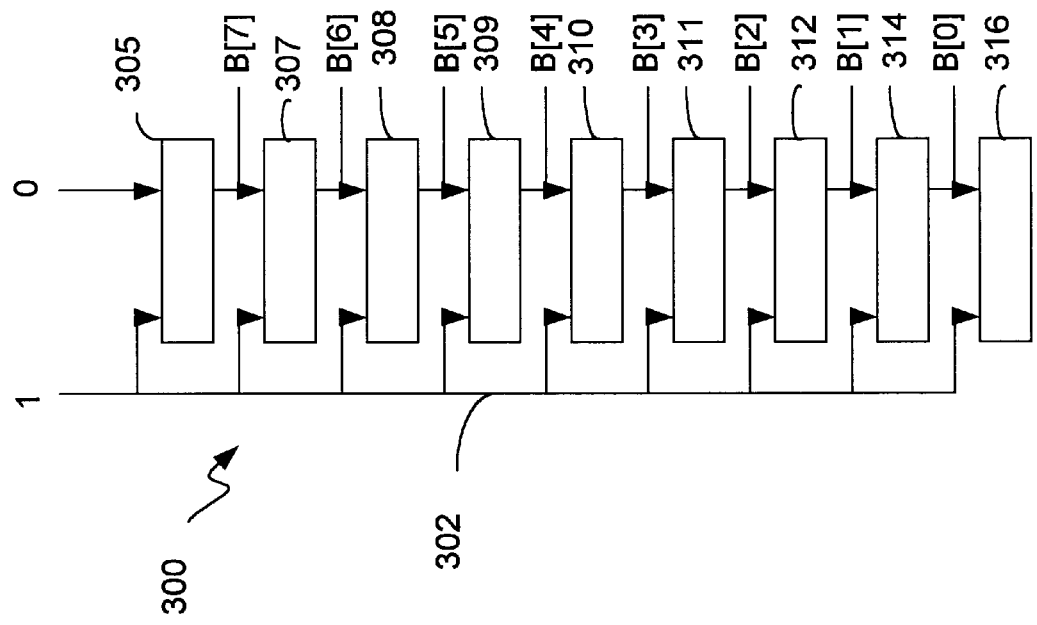
FIG. 9 is a block diagram of a shift register utilized for indicating the batch that transactions are associated with in accordance with an alternative embodiment.

In addition to the other information received by the row read pointer 321 discussed above, the row read pointer 321 also utilizes information from the B shift register 300 shown in FIG. 9, which is indicated by line 320 in FIG. 10 and by the uppercase "B". Additionally, the row read pointer 321 also receives a "current batch" indicator 322 from the RAM controller 91. The manner in which the "current batch" indicator is utilized by the row read pointer 321 is demonstrated below with respect to the table shown in FIG. 11.

The table shown in FIG. 11 is similar to the table shown in FIG. 8 except that it contains additional columns and the entries in the tables are different. The manner in which the columns 332, 333, 335 and 336 are utilized is identical to that discussed above with respect to FIG. 8. Column 331 in FIG. 11 is the "batch" column, which corresponds to the entries in the batch shift register 300. In this example, all of the entries in the batch column 331 are 0 except for one entry having a value of 1. In this example, the current batch ID is 0. Therefore, the entry in column 331, row 346 having a value of 1 indicates that the corresponding transaction is a member of a different batch and the entry below row 346 is the last entry of the current batch. The "MEM" column 334 contains entries which correspond to a logical operation performed on the current batch ID (which is 0 in this example) input to the row read pointer 321 from the RAM controller 91 via line 322 and the transaction batch ID's (B) input into the row read pointer 321 via line 320. An exclusive NOR (XNOR) operation is used to compare each transaction batch ID (B) with the current batch ID to generate a MEM entry for that transaction. Therefore, the entries in column 334, rows 352, 351, 349 and 348 are all 1s because the current batch ID provided from the RAM controller 91 is 0 and the batch ID provided from the B shift register 300 is 0, as indicated by the entries in rows 352, 351, 349 and 348 in column 331.

The entry in column 331, row 346 is a 1, but the current batch ID from the RAM controller 91 continues to be 0. Therefore, the result of the XNOR operation is 0, as shown in the MEM column 334, row 346. This 0 entry indicates that the transaction corresponding to the entry in column 331, row 346 is not part of the current batch. This 0 entry in the MEM column 334 causes inhibit signals, denoted as INH0 and INH1 in columns 338 and 339, to be generated. These inhibit signals prevent any row address corresponding to candidates above this entry in the table from being sent to the row port output register 136 until the entries above this entry actually become members of the current batch. Only paging candidates from the lower four locations (candidate in row 352 for this example) will be sent to the row port. The CAND1 entry in column 336, row 344 having a value of 1 will not be sent to the row port output register 136 until the transactions corresponding to the bottom five entries in the table have been processed. Once the lower four transactions corresponding to the current batch have been unloaded, the RAM controller 91 will toggle the current batch ID to 1 allowing the fifth transaction, row 346, with a batch ID of 1 to become a member of the current batch. Once this transaction is unloaded, the RAM controller 91 will toggle the current batch ID back to 0 allowing the top four entries to become members of the current batch.

The entries in column 333 also cause the inhibit signals to be generated. Valid entries for bank0 cause inhibit 0 (INH0) signals to be generated as shown in column 338, rows 352, 351, 349 and 348, which prevent any bank0 row addresses corresponding to entries above these entries from being sent to row port output register 136. However, since these entries do not involve bank1, bank1 is not inhibited, as indicated by the 0s in column 339, rows 352, 351, 349 and 348.

Similarly, valid entries for bank1 cause an inhibit 1 (INH1) signal to be generated as shown in column 339, rows 344, 342 and 341, which prevents any bank1 row addresses corresponding to entries above these entries from being sent to the row port output register 136. Since these entries do not involve bank0, bank0 is not inhibited, as indicated by zeros in column 338, rows 344, 342, and 341.

In order to perform inter-FIFO look-ahead paging, the FIFOs 81, 83, 84 and 86 utilize all of the values contained in the V shift register 180 and in the b shift register 203 to generate "no-bank" flags. In accordance with the preferred embodiment of the present invention, the bits stored in the b shift register 203 that correspond to bank0 entries are inverted and then are logically ANDed with the bits stored in the respective locations in the V shift register 180. For example, if the entries stored at locations 206, 209 and 213 in b shift register 203 are bank0 entries, their values will be 0. These values will be inverted to 1 and then individually ANDed with the values stored at locations 185, 188 and 194, respectively, in the V shift register 180. The results of these individual logical operations are then NORed together to generate a "no-bank0" flag. Therefore, the no-bank0 flag will only be asserted if the results of each of the AND operations is 0, i.e., only if there are no valid bank0 entries.

In order to generate the no-bank1 flag, the bits stored in b shift register 203 that correspond to bank1 entries are logically ANDed with the bits stored in the respective locations in V shift register 180. For example, if the entries stored at locations 206, 209 and 213 in b register 203 are bank1 entries, their values will be 1. These values will be individually ANDed with the values stored at locations 185, 188 and 194 in the V shift register 180, respectively. The results of these individual logical operations are then NORed together to generate a no-bank1 flag. Therefore, the no-bank1 flag will only be asserted if the results of each of the AND operations is 0, i.e., only if there are no valid bank1 entries.

When the RAM controller 91 determines that there are no bank0 entries remaining in the FIFO, the RAM controller 91 will re-page bank0 for the next FIFO in the sequence. Similarly, when the RAM controller 91 determines that there are no bank1 entries remaining in the FIFO, the RAM controller 91 will re-page bank1 for the next FIFO in the sequence.

As stated above, each RAM controller controls the switching between its respective FIFOs in accordance with a particular sequence and performs inter-FIFO look-ahead paging in accordance with the present invention. In accordance with the preferred embodiment of the present invention, in the rendering mode, the RAM controller switches first to the Read Z FIFO 86, then to the Write Z FIFO 84 and then to the Write Pixel FIFO 81. This sequence is repeated until an interrupt request occurs. When an interrupt request occurs, the RAM controller 91 enters the auxiliary path mode and switches to an auxiliary request FIFO (not shown) to service interrupts such as a request for frame buffer data to refresh the display. Once the interrupt has been serviced, the RAM controller 91 returns to the rendering mode and re-enters the sequence at the point it was at when the interrupt occurred.

In the rendering mode, when the RAM controller 91 switches to the Read Z FIFO 86, a batch of Z coordinate data is read out of addresses of the RAM memory element 45 which correspond to addresses stored in the Read Z FIFO 86. A Z comparison test is then performed on the batch to determine whether the new Z coordinate data needs to be written into the frame buffer memory. If the Z comparison test passes, the RAM controller 91 switches to the Write Z FIFO 84 and the new Z coordinate data is written into the memory element 45. The RAM controller 91 then switches to the Write Pixel FIFO 81 and the corresponding pixel colors that are stored in the Write Pixel FIFO 81 are written into the memory element 45.

Another advantageous feature of the graphics memory system of the present invention is that it minimizes interrupt latency. As stated above, the RAM controller 91 switches between the FIFOs in a particular sequence until an interrupt occurs. When an interrupt occurs, the RAM controller 91 exits the rendering mode and enters the auxiliary mode to service the interrupt. In accordance with the preferred embodiment of the present invention, the RAM controller 91 services the interrupt immediately, rather than waiting until the transaction in progress has been completed before servicing the interrupt. If the RAM controller was required to complete the transaction in progress before servicing the interrupt, interrupt latency would increase making it more difficult to refresh the display.

In accordance with the preferred embodiment of the present invention, when an interrupt occurs, the RAM controller 91 immediately services the interrupt, thereby reducing interrupt latency. In the rendering mode, requests are sent from the FIFOs 81, 83, 84 and 86 to the RAM controller 91. In response to receiving the requests from the FIFOs, the RAM controller 91 sends commands to the RAM memory element 45. In accordance with the preferred embodiment of the present invention, servicing of all rendering requests is indivisible and thus immediately interruptable. This is accomplished by requiring that the sending of any command from the FIFO occurs within the same state during which the associated request is sent from the RAM controller 91 to the memory element 45.

Therefore, with respect to write requests being sent from one of the FIFOs to the RAM controller 91, an interrupt that occurs in the same state as the state in which the write request occurs will cause the write request to be suspended. The write request will not be unloaded from the FIFO until the interrupt has been serviced. Therefore, no data will be lost in servicing the interrupt because the write request will not be unloaded until the interrupt has been serviced. If the interrupt occurs either before or after the state in which the write request occurs, the write request will not be affected because the unloading of the write request occurs in the same state as the state in which the corresponding command is sent from the RAM controller 91 to the RAM memory element 45.

With respect to read requests being sent from one of the FIFOs to the RAM controller 91, an interrupt that occurs in the same state as the state in which the read request occurs will cause the read request to be suspended in the same way as a write request. However, if the interrupt occurs after the read requests has been unloaded and before the read data has been received, there is a potential for the read data to be lost. Prior graphics memory systems have handled this problem by waiting until the read transaction is complete before servicing the interrupt thus ensuring that no read data is lost due to servicing of the interrupt. In accordance with the preferred embodiment of the present invention, a "load read data" command is piped when the read request is unloaded by the RAM controller 91 and sent to the RAM memory element 45. The pipe delay is chosen to match the read data response time so that when the read data is returned from the RAM memory element 45, the load read data command is issued by the RAM controller 91 to cause the read data to be sent to the proper location. This allows the interrupt to be serviced simultaneously with the processing of the read transaction while preventing any read data from being lost.

It should be noted that the present invention has been described with respect to the preferred embodiments, but that the present invention is not limited to these embodiments. The preferred embodiments have been discussed in order to demonstrate the present invention, but it will be understood by those skilled in the art that the present invention can be implemented in a variety of ways to achieve the results of the present invention discussed above with respect to the preferred embodiments.

What is claimed is:

1. A graphics memory system comprising:
   a memory element having at least a first memory bank and a second memory bank, each memory bank being capable of being re-paged while transactions for the other memory bank are being processed, wherein a memory bank is re-paged by opening a row in the memory bank;
   a memory controller in communication with the memory element, the memory controller issuing commands to the memory element to cause information to be written to and read from addressed locations in the memory element;
   a plurality of storage devices comprised by the memory controller, the storage devices containing entries corresponding to transactions for the first memory bank or for the second memory bank, the memory controller analyzing information relating to the entries contained in one of said storage devices to determine whether said one storage device contains no entries corresponding to transactions for the first memory bank, wherein if the memory controller determines that said one storage device contains no entries corresponding to transactions for the first memory bank, the memory controller re-pages the first memory bank for a second storage device of said plurality of storage devices.

2. The graphics memory system of claim 1, wherein the storage devices are first-in-first-out (FIFO) memory devices.

3. The graphics memory system of claim 2, wherein the memory controller comprises at least three FIFO memory devices, the FIFO memory devices including a Read Z FIFO, a Write Z FIFO, and a Write Pixel FIFO, the memory controller communicating with the memory element and with each of the FIFO memory devices in a particular sequence of communications, the sequence beginning with a communication with the Read Z FIFO during which the memory controller receives a read request from the Read Z FIFO which causes the memory controller to read a batch of Z coordinate data out of addresses of the memory element, the batch of Z coordinate data corresponding to addresses stored in the Read Z FIFO, the batch of Z coordinate data being analyzed in accordance with a Z comparison test to determine whether new Z coordinate data shall be placed in the Write Z FIFO to be written into the memory element, wherein when the memory controller ends the communication with the Read Z FIFO, the memory controller begins a communication with the Write Z FIFO during which the memory controller receives a write request from the Write Z FIFO which causes the memory controller to write the new Z coordinate data contained in the Write Z FIFO into the memory element, wherein once the new Z coordinate data has been written into the memory element, the communication with the Write Z FIFO ends and the memory controller begins a communication with the Write Pixel FIFO during which the memory controller receives a write request from the Write Pixel FIFO which causes the memory controller to write pixel colors contained in the Write Pixel FIFO into the memory element, the pixel colors being associated with the new Z coordinate data.

4. The graphics memory system of claim 3, wherein when the memory controller is in communication with the memory element and with the Read Z FIFO, the memory controller determines whether there are no more transactions in the Read Z FIFO for the first memory bank, wherein if the memory controller determines that there are no more transactions in the Read Z FIFO for the first memory bank, the memory controller causes the first memory bank to be re-paged for the Write Z FIFO, and wherein when the memory controller is in communication with the memory element and with the Write Z FIFO, the memory controller determines whether there are no more transactions in the Write Z FIFO for the first memory bank, wherein if the memory controller determines that there are no more transactions in the Write Z FIFO for the first memory bank, the memory controller causes the first memory bank to be re-paged for the Write Pixel FIFO.

5. The graphics memory system of claim 4, wherein the graphics memory system has a two-bank architecture and wherein the first memory bank corresponds to bank0 of the two-bank architecture and the second memory bank corresponds to bank1 of the two-bank architecture.

6. The graphics memory system of claim 4, wherein the graphics memory system has a two-bank architecture and wherein the second memory bank corresponds to bank0 of the two-bank architecture and the first memory bank corresponds to bank1 of the two-bank architecture.

7. The graphics memory system of claim 3, wherein the graphics memory system is immediately interruptable so that when an interrupt occurs, the interrupt is immediately serviced, and wherein each communication between the memory controller, the memory element and the Write Z FIFO occurs within a single state, and wherein if an interrupt occurs in the same state that the communication between the memory controller, the memory element and the Write Z FIFO occurs in, the write request will not be unloaded from the Write Z FIFO until after the interrupt has been serviced.

8. The graphics memory system of claim 3, wherein the graphics memory system is immediately interruptable so that when an interrupt occurs, the interrupt is immediately serviced, and wherein each communication between the memory controller, the memory element and the Write Pixel FIFO occurs within a single state, and wherein if an interrupt occurs in the same state that the communication between the memory controller, the memory element and the Write Pixel FIFO occurs in, the write request will not be unloaded from the Write Pixel FIFO until after the interrupt has been serviced.

9. The graphics memory system of claim 3, wherein the graphics memory system is immediately interruptable so that when an interrupt occurs, the interrupt is immediately serviced, and wherein when a read request is unloaded from the Read Z FIFO, a load-read-data command is piped into a data pipeline for a predetermined delay period which matches an amount of time required for the Z data to be read out of the memory element by the memory controller, the load-read-data command designating the destination of the Z data read out of the memory element, and wherein if an interrupt occurs one state after the read request was unloaded from the Read Z FIFO, the Z data read out of the memory element would be properly received at the destination designated by the load-read-data command while the interrupt was being serviced.

10. The graphics memory system of claim 3, wherein the graphics memory system is immediately interruptable so that when an interrupt occurs, the interrupt is immediately serviced, the graphics memory system further comprising a Read Pixel FIFO, and wherein when a read request is unloaded from the Read Pixel FIFO, a load-read-data command is piped into a data pipeline for a predetermined delay period which matches an amount of time required for the pixel colors to be read out of the memory element by the memory controller, the load-read-data command designating the destination of the pixel colors read out of the memory element, and wherein if an interrupt occurs one state after the read request was unloaded from the Read Pixel FIFO, the pixel colors read out of the memory element would be properly received at the destination designated by the load-read-data command while the interrupt was being serviced.

11. The graphics memory system of claim 1, wherein the graphics memory system has a two-bank architecture and wherein the first memory bank corresponds to bank0 of the two-bank architecture and the second memory bank corresponds to bank1 of the two-bank architecture.

12. The graphics memory system of claim 1, wherein the graphics memory system has a two-bank architecture an wherein the second memory bank corresponds to bank0 of the two-bank architecture and the first memory bank corresponds to bank1 of the two-bank architecture.

13. The graphics memory system of claim 1, wherein the graphics memory system is immediately interruptable so that when an interrupt occurs, the interrupt is immediately serviced.

14. A method of reducing paging overhead in a graphics memory system comprising the steps of:

implementing a frame buffer memory having at least a first memory bank and a second memory bank, each memory bank being capable of being re-paged while transactions for the other memory bank are being processed, wherein a memory bank is re-paged by opening a row in the memory bank;

utilizing a memory controller for issuing commands to the frame buffer memory to cause information to be written to and read from addressed locations in the frame buffer memory;

storing entries in a plurality of storage devices comprised by the memory controller, the entries corresponding to transactions for the first memory bank or for the second memory bank;

analyzing information relating to the entries contained in one of said storage devices to determine whether said one storage device contains no entries corresponding to transactions for the first memory bank, wherein if the memory controller determines that said one storage device contains no entries corresponding to transactions for the first memory bank, the memory controller re-pages the first memory bank for a second storage device of said plurality of storage devices.

15. The method of claim 14, wherein the graphics memory system has a two-bank architecture and wherein the first memory bank corresponds to bank0 of the two-bank architecture and the second memory bank corresponds to bank1 of the two-bank architecture.

16. The method of claim 14, wherein the graphics memory system has a two-bank architecture and wherein the second memory bank corresponds to bank0 of the two-bank architecture and the first memory bank corresponds to bank1 of the two-bank architecture.

17. The method of claim 14, wherein the storage devices are first-in-first-out (FIFO) memory devices and wherein the memory controller comprises at least three rendering FIFO memory devices, the FIFO memory devices including a Read Z FIFO, a Write Z FIFO, and a Write Pixel FIFO and a Read Pixel FIFO, wherein the step of utilizing the memory controller includes the steps of:

initiating a communication between the memory controller, the frame buffer memory and the Read Z FIFO during which the memory controller receives a read request from the Read Z FIFO which causes the memory controller to read a batch of Z coordinate data out of addresses of the frame buffer memory, the batch of Z coordinate data corresponding to addresses stored in the Read Z FIFO, the communication being initiated by the memory controller;

analyzing the batch of Z coordinate data in accordance with a Z comparison test to determine whether new Z coordinate data shall be placed in the Write Z FIFO to be written into the frame buffer memory;

once the batch of Z coordinate data has been read, ending the communication with the Read Z FIFO and initiating a communication with the Write Z FIFO during which the memory controller receives a write request from the Write Z FIFO which causes the memory controller to write the new Z coordinate data contained in the Write Z FIFO into the frame buffer memory; and once the new Z coordinate data has been written into the frame buffer memory, ending the communication with the Write Z FIFO and initiating a communication with the Write Pixel FIFO during which the memory controller receives write requests from the Write Pixel FIFO which causes the memory controller to write pixel colors contained in the Write Pixel FIFO into the frame buffer memory, the pixel colors being associated with the new Z coordinate data.

18. The method of claim 17, wherein when the memory controller is in communication with the frame buffer memory and with the Read Z FIFO, the memory controller determines whether there are no more transactions in the Read Z FIFO for the first memory bank, wherein if the memory controller determines that there are no more transactions in the Read Z FIFO for the first memory bank, the memory controller causes the first memory bank to be re-paged for the Write Z FIFO, and wherein when the memory controller is in communication with the memory element and with the Write Z FIFO, the memory controller determines whether there are no more transactions in the Write Z FIFO for the first memory bank, wherein if the memory controller determines that there are no more transactions in the Write Z FIFO for the first memory bank, the memory controller causes the first memory bank to be re-paged for the Write Pixel FIFO.

19. The method of claim 14, wherein the graphics memory system has a two-bank architecture and wherein the first memory bank corresponds to bank0 of the two-bank architecture and the second memory bank corresponds to bank1 of the two-bank architecture.

20. The method of claim 14, wherein the graphics memory system has a two-bank architecture and wherein the second memory bank corresponds to bank0 of the two-bank architecture and the first memory bank corresponds to bank1 of the two-bank architecture.

21. The method of claim 14, wherein the graphics memory system is immediately interruptable so that when an interrupt occurs, the interrupt is immediately serviced.

22. The method of claim 21, wherein each communication between the memory controller, the frame buffer memory and the Write Z FIFO occurs within a single state, and wherein if an interrupt occurs in the same state that the communication between the memory controller, the frame buffer memory and the Write Z FIFO occurs in, the write request will not be unloaded from the Write Z FIFO until after the interrupt has been serviced.

23. The method of claim 22, wherein each communication between the memory controller, the frame buffer memory and the Write Pixel FIFO occurs within a single state, and wherein if an interrupt occurs in the same state that the communication between the memory controller, the frame buffer memory and the Write Pixel FIFO occurs in, the write request will not be unloaded from the Write Pixel FIFO until after the interrupt has been serviced.

24. The method of claim 23, wherein when a read request is unloaded from the Read Z FIFO, a load-read-data command is piped into a data pipeline for a predetermined delay period which matches an amount of time required for the Z data to be read out of the frame buffer memory by the memory controller, the load-read-data command designating the destination of the Z data read out of the frame buffer memory, and wherein if an interrupt occurs one state after the read request was unloaded from the Read Z FIFO, the Z data read out of the memory element would be properly received at the destination designated by the load-read-data command while the interrupt was being serviced.

25. The method of claim 23, wherein the memory controller further comprises a Read Pixel FIFO, and wherein when a read request is unloaded from the Read Pixel FIFO, a load-read-data command is piped into a data pipeline for a predetermined delay period which matches an amount of time required for the pixel colors to be read out of the frame buffer memory by the memory controller, the load-read-data command designating the destination of the pixel colors read out of the frame buffer memory, and wherein if an interrupt occurs one state after the read request was unloaded from the Read Pixel FIFO, the pixel colors read out of the frame buffer memory would be properly received at the destination designated by the load-read-data command while the interrupt was being serviced.

* * * * *

UNITED STATES PATENT AND TRADEMARK OFFICE
CERTIFICATE OF CORRECTION

PATENT NO.     : 6,078,336
DATED          : June 20, 2000
INVENTOR(S)    : Gerald W. Reynolds It is certified that error appears in the above-identified patent and that said Letters Patent is hereby corrected as shown below:

Column 20,
Line 13, delete "an" and insert therefor -- and --

Signed and Sealed this

Fourth Day of June, 2002

Attest:

Attesting Officer

JAMES E. ROGAN
Director of the United States Patent and Trademark Office